Patented Sept. 30, 1924.

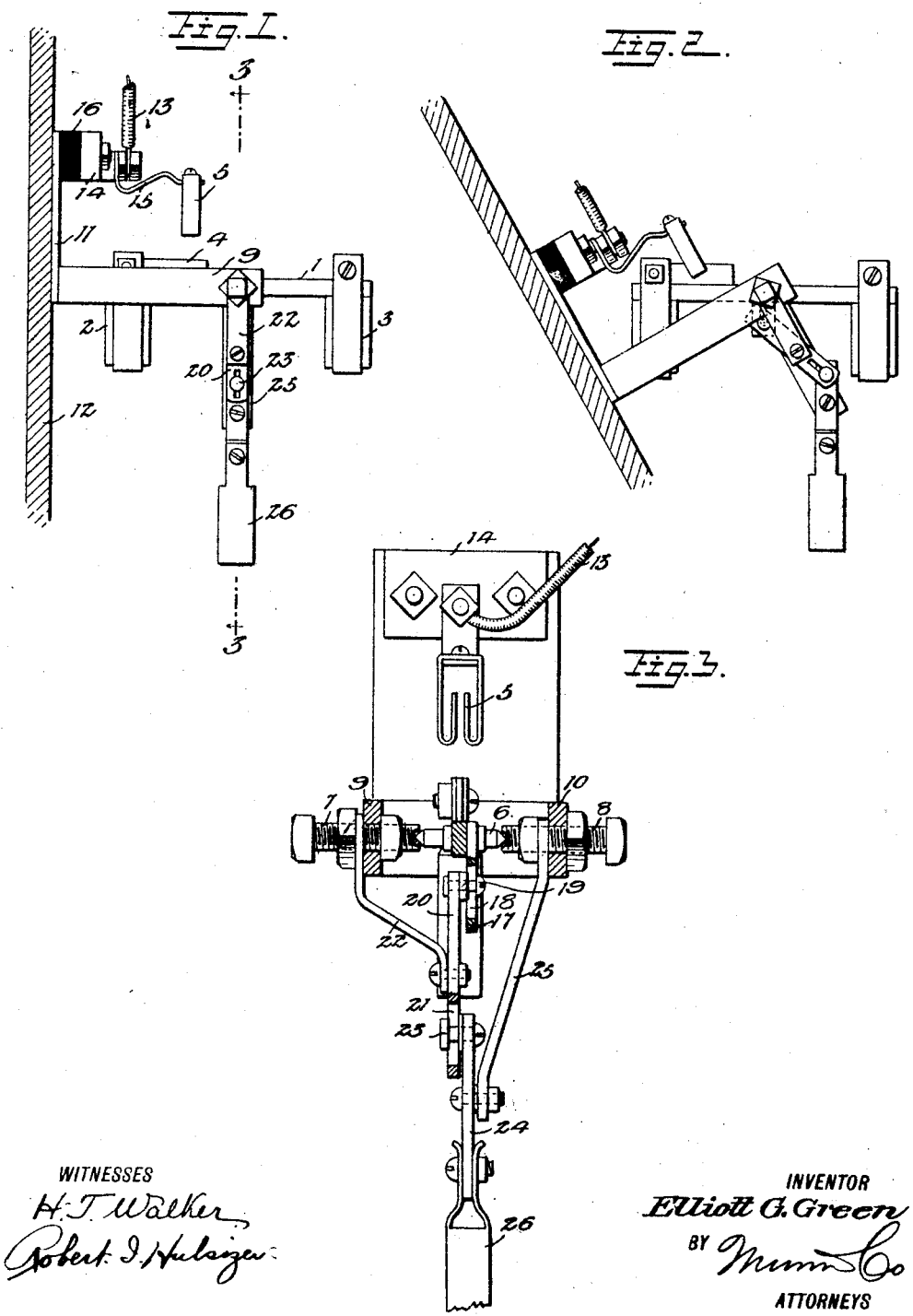

1,510,318

UNITED STATES PATENT OFFICE.

ELLIOTT G. GREEN, OF WOLCOTT, NEW YORK.

BALANCE SWITCH FOR TRACTORS.

Application filed May 23, 1922. Serial No. 563,049.

*To all whom it may concern:*

Be it known that I, ELLIOTT G. GREEN, a citizen of the United States, and a resident of Wolcott, in the county of Wayne and State of New York, have invented a new and Improved Balance Switch for Tractors, of which the following is a full, clear, and exact description.

This invention relates to a balance switch, and has particular reference to one adapted for use in connection with farm tractors.

An object of the invention is to provide a switch which will close to kill a motor whenever the support on which the motor is mounted, such as the body or frame of a tractor, is tilted at a dangerous angle, to prevent the tractor from overturning.

A further object resides in the provision of a switch which is simple in its operation, economical to manufacture and assemble, and posessed of a minimum liability to get out of repair.

A still further object resides in the provision of a switch in which the operation takes place only due to excessive tilting from normal of the frame on which the switch is mounted and will not be affected by ordinary swinging or vibration of the support.

Another object resides in the particular construction and arrangement of parts which are hereinafter described and claimed and shown in the accompanying drawings.

The invention is illustrated in the drawings, of which—

Figure 1 is a side view of the switch applied to a suitable support, such as the dashboard of a tractor.

Fig. 2 is a side view showing the parts in the positions they assume when the vehicle is tilted at an undue angle.

Fig. 3 is a vertical transverse section of the parts taken on the line 3—3 of Fig. 1.

The form of the invention shown in the drawings is a preferred form, although it is understood that modifications in the construction and arrangement of the parts and in the character of the materials used may be adopted without departing from the spirit of the invention.

The preferred form of the invention shown in the drawings comprises an arm 1 on the ends of which are disposed weights 2 and 3. One end of the arm is provided with a switch element 4 adapted when the arm assumes a certain position relative to its support to contact with a second switch element 5 which is suitably connected with the ignition circuit of a motor. The arm 1 is provided with a transversely extending pin 6 pivoted between bearing pins in screws 7 and 8 which are adjustably mounted in plates or arms 9 and 10. These arms are connected at their other ends to a plate 11 mounted on a support 12, which in this case is the dash- or instrument-board of a tractor. In the form shown the dashboard is made of metal so that an electrical contact is formed between the plate 11 and the support 12 and, consequently, between the dashboard and the swinging arm 1.

The switch arm 1 is connected to the ignition circuit of a motor by a wire 13. This switch arm is mounted on a suitable base 14 and connected thereto by a link or strap 15. The base 14 is insulated from the support 12 by a suitable block 16 of insulation. The arm 1 is provided with a dependent arm 17 having a slot 18 therein. In this slot a pin 19 is adapted to move. This pin is connected to the outer end of a lever 20, the other end of which is provided with a slot 21. This lever 20 is pivoted on a bracket plate 22 connected to the arm 9. In the slot 21 a pin 23 is adapted to move. This pin is connected to the outer end of a pendulum lever 24. This pendulum lever is pivoted to a bracket plate 25. The lower end of the pendulum lever is provided with a weight 26.

The parts of this switch and its cooperating elements are shown in their normal position in Fig. 1. These elements are attached in such manner to a support, such as the dashboard of a tractor, that the switch elements are not in contact during the usual operation of the tractor. However, when the lever of the support is changed beyond a reasonable amount, the parts assume the position shown in Fig. 2. The amount to which the support can tilt before the switch element is engaged may be varied as desired.

It has been found in the operation of farm tractors that if the rear wheels are blocked or the progress of the tractor is impeded in any way, the action of the differential will cause the front of the tractor to tilt up, and in some cases the body will be completely overturned with considerable damage to the tractor and liability of injury to the operator. It was to avoid this contingency that this balance switch was conceived. The general idea, of course, is to provide a switch which will be operated in accordance with the change in level of the platform or support on which it is mounted to open or close any desired electrical circuit, the specific form thereof, of course, being specially adapted for use with a farm tractor.

When the parts are in the position shown in Fig. 1, any vibration or swinging movement not beyond a reasonable amount will not affect the elements, because the tendency of the weights will be to balance or react on each other; but when the tractor climbs a hill, or when on level ground the wheels are blocked, the decided and more or less permanent change in level, due to the engine or differential lifting the body upward, will cause the switch to operate. It is assumed that the dashboard is a metal plate which would, therefore, be grounded to the motor base. If not, of course, this dashboard or plate should have a special wire connecting it to the motor base. When the switch is closed, the various parts thereof being practically substantially all made of metal will form the necessary circuit between the wire 13 and the dashboard 12. When the switch is closed the motor becomes short circuited and stops. The angle at which the motor may be thus killed can be changed at will by raising or lowering the switch element or brushes 5.

What I claim is:

A balance switch for vehicles, which comprises bracket arms fastened to the dashboard of the vehicle, a lever pivoted on said arms, weights on the ends of said lever, a second arm dependent from the pivoted lever having a slot therein, a second lever pivoted on said arms, a pin on the end of said second lever extending into said slot, said second lever having a slot in its other end, a pendulum lever pivoted on the arms, a pin on the end of said pendulum lever extending into the slot in the second lever, a switch element on the first lever, and a second switch element associated but normally out of contact therewith, the movement of the pendulum lever in accordance with the variation in inclination of the switch support causing the engagement of the switch elements.

ELLIOTT G. GREEN.